Nov. 29, 1927.
G. W. VEALE
1,651,005
BUMPER
Filed March 16, 1927
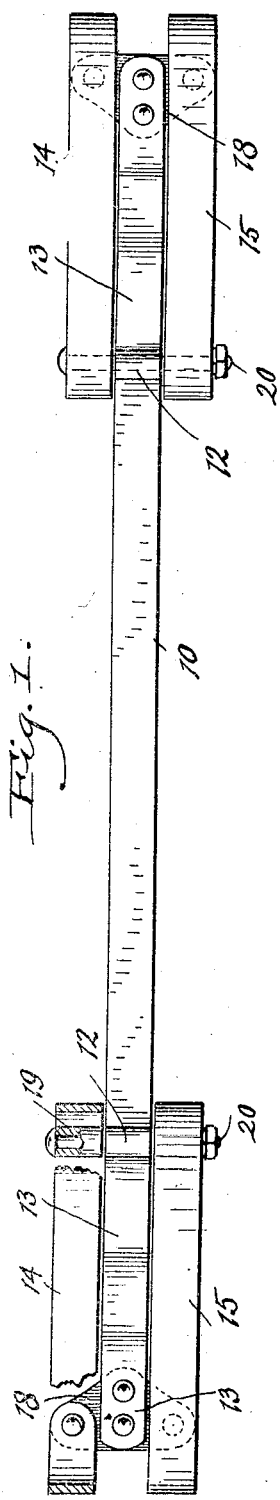
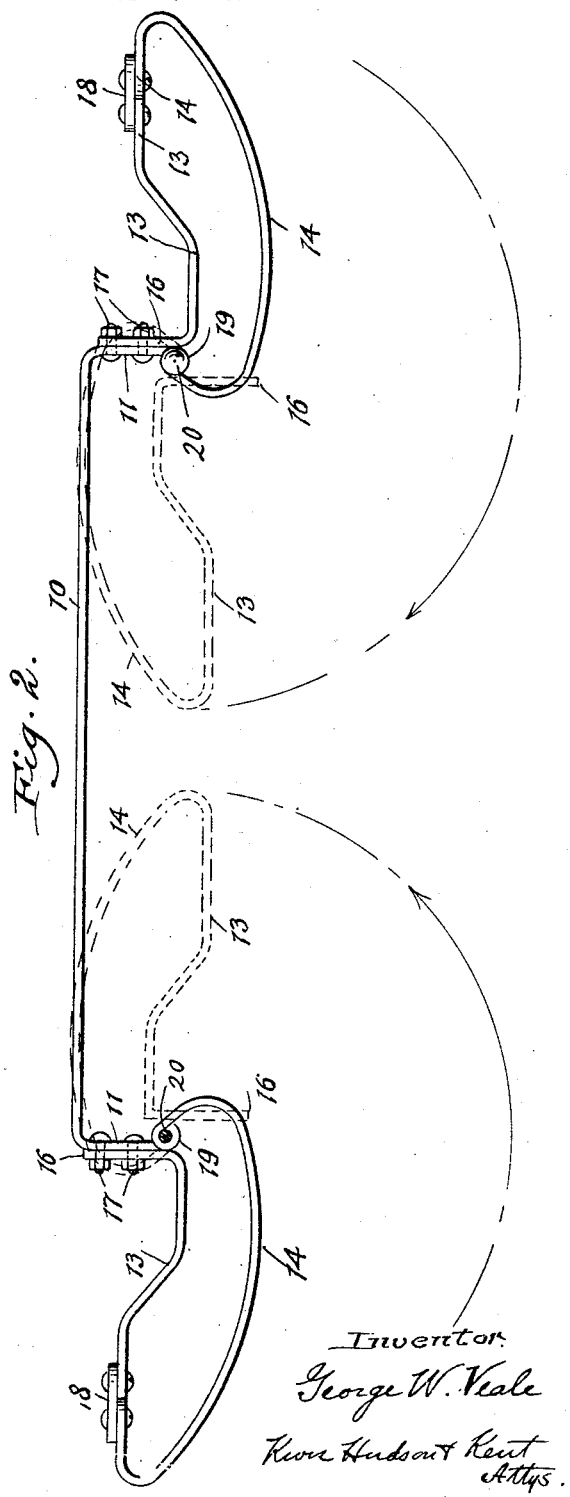
Inventor:
George W. Veale
Kron Hudson & Kent
Attys.

Patented Nov. 29, 1927.

1,651,005

UNITED STATES PATENT OFFICE.

GEORGE W. VEALE, OF CLEVELAND HEIGHTS, OHIO, ASSIGNOR TO THE EATON AXLE & SPRING COMPANY, OF CLEVELAND, OHIO, A CORPORATION OF OHIO.

BUMPER.

Application filed March 16, 1927. Serial No. 175,668.

This invention relates to improvements in bumpers for use at the rear of automobiles and of a type known in the art as fender guards.

One object of the invention is to provide a bumper of this type that can be folded so as to get it into compact form for convenience in shipping.

Another object is to provide a simple, inexpensive and rigid securing means for the inner extremities of the impact receiving bars.

Other objects of the invention and the features of novelty will appear from the following description taken in connection with the accompanying drawing, in which:

Fig. 1 is an elevational view looking toward the bumper from a position in the rear of the automobile to which it is attached, some of the parts being broken away to better illustrate the invention; and Fig. 2 is a plan view of the bumper with the impact receiving portions shown in their folded position by means of broken lines.

In the drawing, the transverse bar which constitutes the tie between the impact receiving portions and by means of which the bumper may be attached to an automobile is indicated at 10. As illustrated herein, this transverse bar 10 has bent end portions 11 which at their extremities are rolled up to form eyes 12.

The extensions at either end of the transverse bar 10 are preferably though not necessarily in the form of horizontally arranged loops of spring steel. These loops may be built up in various ways, but preferably comprise a supporting portion which is made of a single bar 13 and an impact receiving portion which is made up of two spaced superimposed bars 14 and 15. The bar 13 which is conveniently of the same cross section as transverse bar 10 has a bent end portion 16 abutting the end portion 11 of the transverse bar and detachably secured thereto by means of bolts 17 or the like. At its opposite end the bar 13 is riveted to a plate 18 to which are also riveted the rebent outer extremities of the bars 14 and 15.

These bars 14 and 15 are preferably bowed and provided with curved or rounded ends in order to provide resiliency, as is common in the art. At their inner extremities they are rolled up to form eyes 19 which fall above and below and register with the eye 12 of the transverse bar, a suitable pivot in the form of a bolt or rivet 20 being inserted through the eyes as shown.

In assembling this bumper preparatory to shipment thereof, the extensions at each end are attached to the transverse bar 10 by means of the bolts or rivets 20, but the bolts 17 are not put in place. The extensions are then swung into their broken line positions illustrated in Fig. 2 and the bumper, with the loose bolts 17, is inserted into a suitable carton which is, of course, very much more compact than would be the case if the bumper were shipped in its extended operative condition. At the same time the swinging of the extensions into their correct position for mounting upon an automobile and the application of the bolts 17 are very quickly and easily accomplished and there is no possibility of a mistake being made by an inexperienced workman, as might readily occur were the parts shipped in an unassembled condition.

Having thus described my invention, I claim:

1. In a bumper for the rear of an automotive vehicle, a transverse bar, extensions pivotally mounted on the ends thereof and adapted to be swung into folded position between the ends thereof, and means for detachably securing said extensions to said bar in operative position.

2. In a bumper for the rear of an automotive vehicle, a transverse bar with angularly bent end portions, extensions pivotally mounted on said end portions and adapted to be swung into folded position between the said end portions, said extensions having bent portions abutting said bent end portions, and means for detachably securing together said bent portions and bent end portions for holding the extensions in operative position.

3. In a bumper for the rear of an automotive vehicle, a transverse bar, an extension therefor embodying a horizontally arranged loop, one end of said loop being pivotally mounted on said transverse bar, and means for removably attaching the other end of the loop to said transverse bar whereby the said extension may be swung upon the said pivotal mounting into folded position.

4. In a bumper for the rear of an automotive vehicle, a transverse bar with an angularly bent end portion, an extension for said transverse bar embodying a horizontally arranged loop with one end adapted to be positioned against the bent end portion of said transverse bar and detachably secured thereto, and with the other end pivotally mounted upon said transverse bar whereby said extension may be swung upon the said pivotal mounting into folded position.

5. In a bumper for the rear of an automotive vehicle, a transverse bar with an angularly bent end portion having an eye in its extremity, an extension for said transverse bar comprising a horizontally arranged loop with one end adapted to be positioned against the bent end portion of the transverse bar and detachably secured thereto, the other end of said loop having a vertical opening therein, and a pivot extending through said opening and eye upon which said extension may be swung into folded position.

6. In a bumper for the rear of an automotive vehicle, a transverse bar with an angularly bent end portion, an extension for said bar embodying a horizontally arranged loop comprising two impact receiving members spaced apart vertically slightly more than the width of said transverse bar, means for detachably securing one end of said loop to the bent end portion of said transverse bar, and pivotal means at the other end of the loop for mounting the vertically spaced members thereof upon said transverse bar whereby the said extension may be swung upon said pivotal means into folded position.

7. In a bumper for the rear of an automotive vehicle, a transverse bar with an angularly bent end portion having an eye in its extremity, an extension for said bar embodying a horizontally arranged loop comprising two impact receiving members spaced apart vertically slightly more than the width of said transverse bar, means for detachably securing one end of said loop to the bent end portion of said transverse bar, the spaced members at the other end of said loop having vertical openings therein registering with said eye, and a pivot through said eye and openings upon which said extension may be swung into folded position.

8. In a bumper for the rear of an automotive vehicle, a transverse bar with an angularly bent end portion, an extension for said transverse bar comprising an angularly bent end portion positioned against the end portion of said transverse bar and secured thereto, one of said end portions having an eye in its extremity, a pair of impact receiving bars secured to said extension one above the other and having eyes adapted to align vertically with the first mentioned eye whereby a bolt may be inserted through the eyes to hold them together.

In testimony whereof, I hereunto affix my signature.

GEORGE W. VEALE.